May 5, 1942. W. R. UHLEMANN ET AL 2,281,812
OPHTHALMIC MOUNTING
Filed May 31, 1941 3 Sheets-Sheet 1
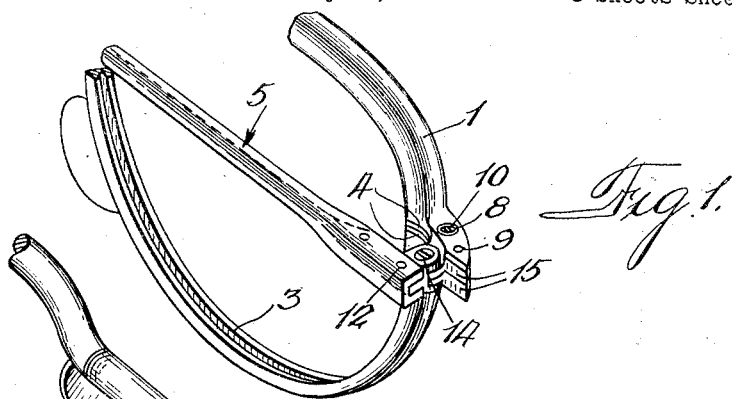
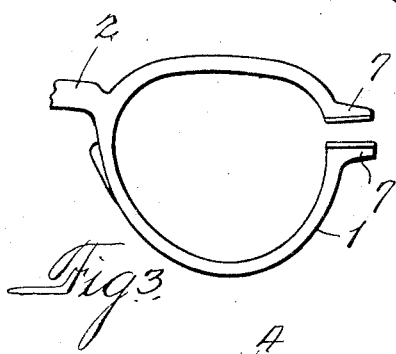
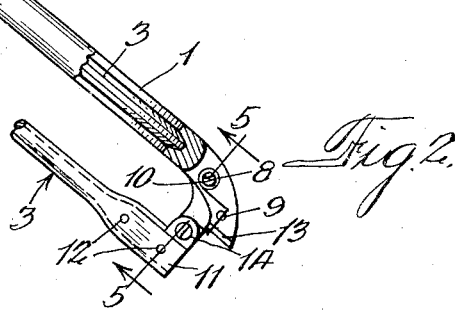
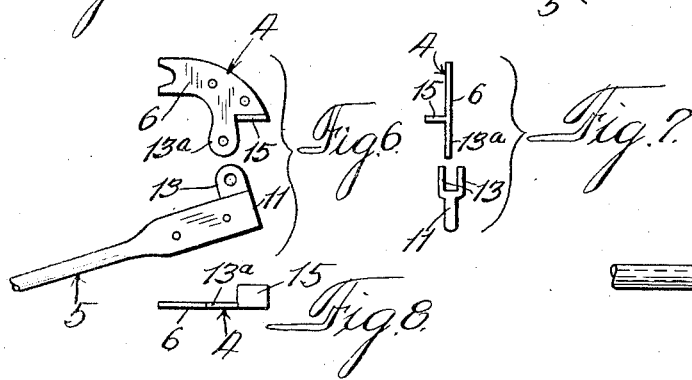
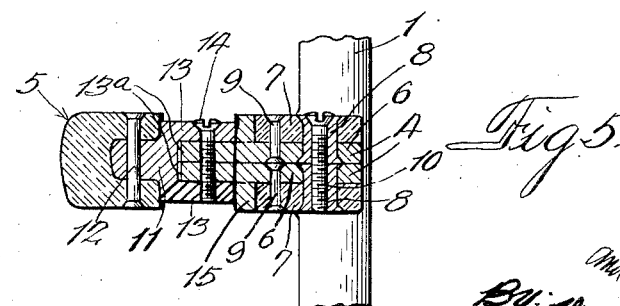

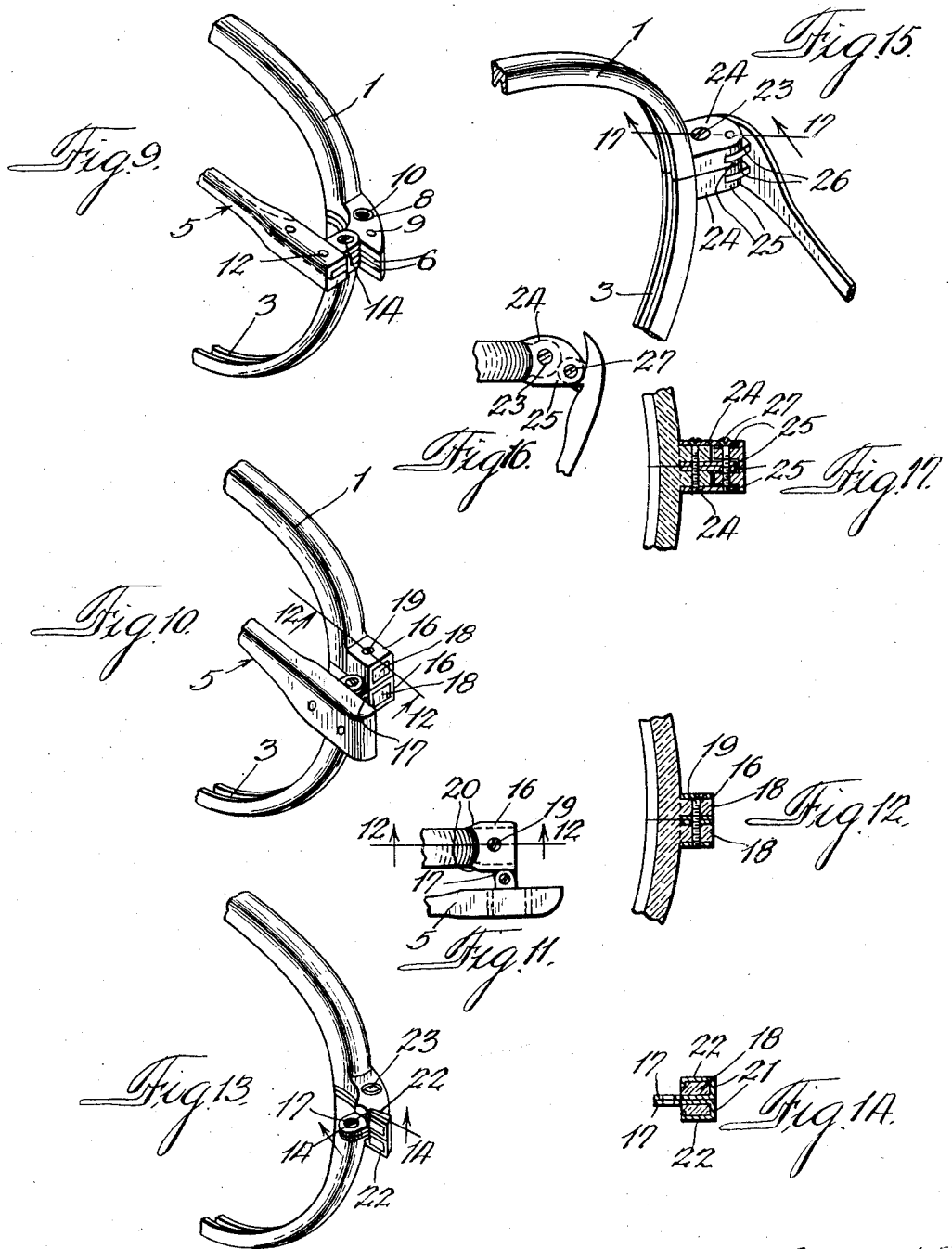

May 5, 1942. W. R. UHLEMANN ET AL 2,281,812
OPHTHALMIC MOUNTING
Filed May 31, 1941 3 Sheets-Sheet 3
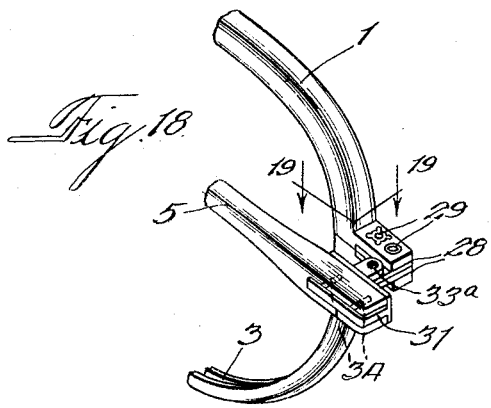
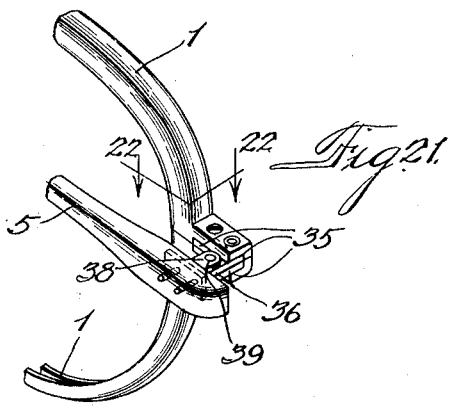
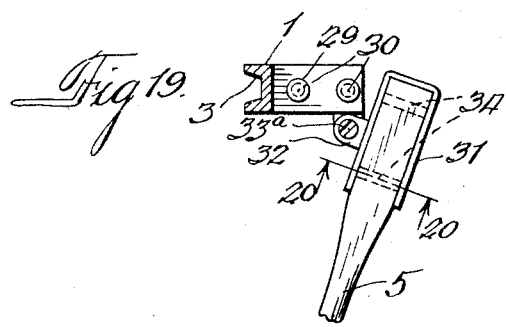
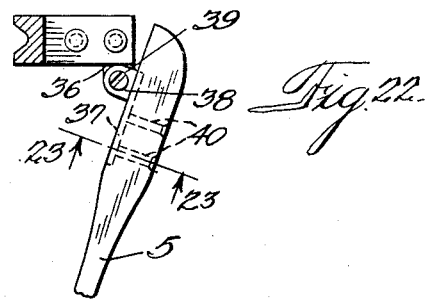
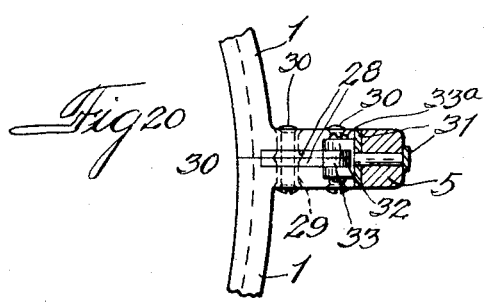
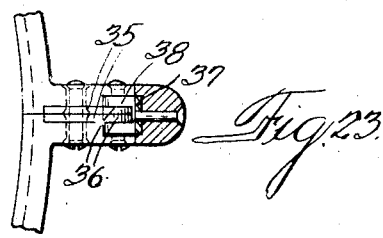

Patented May 5, 1942

2,281,812

UNITED STATES PATENT OFFICE 2,281,812

OPHTHALMIC MOUNTING

William R. Uhlemann, Evanston, and Louis J. Booth, Chicago, Ill., assignors to Uhlemann Optical Co. of Illinois, Chicago, Ill., a corporation of Delaware Application May 31, 1941, Serial No. 395,996

2 Claims. (Cl. 88—53)

Our invention relates to ophthalmic mountings. More particularly, it relates to ophthalmic mountings in which the lens-holding rim is formed of plastic material.

In ophthalmic mountings, in which the lens-holding rims are made of plastic material, it has been usual to make the internal grooved ring continuous, and in inserting the lens to expand the rim to a larger diameter by immersing it in a hot liquid until the diameter of the rim is large enough to allow the lens to be inserted. The rim is then allowed to cool and contract until the lens fits snugly in the internal groove in the rim. This immersion in a hot liquid tends to spoil the high finish on the plastic.

One of the objects of our invention is to provide a mounting having a lens-holding rim of plastic material in which it is not necessary to immerse the rim in a hot liquid in fitting the lens in place.

A further object of our invention is to provide such a mounting in which the rim of plastic material is in the form of a split ring, with each of the adjacent ends of the split ring provided with a hinge portion for connection with the hinge member on the temple.

Further objects and advantages of the invention will be apparent from the description and claims.

In the drawings, in which several embodiments of our invention are shown:

Figure 1 is a perspective view showing one form of our improved mounting;

Fig. 2 is a view looking down on Fig. 1, parts being broken away;

Fig. 3 is a front view of the rim portion of Fig. 1;

Fig. 4 is a side edge view of the mounting;

Fig. 5 is a section substantially on the line 5—5 of Fig. 2;

Fig. 6 is an exploded view showing a hinge member and temple;

Fig. 7 is an exploded elevational view as seen from the right of Fig. 6;

Fig. 8 is an edge view of the hinge member shown in Fig. 6;

Fig. 9 is a perspective view similar to Fig. 1, showing another form of mounting;

Fig. 10 is a perspective view similar to Fig. 9 showing another form of mounting;

Fig. 11 is a view looking down on Fig. 10;

Fig. 12 is a section substantially on the line 12—12 of Figs. 10 and 11;

Fig. 13 is a perspective view similar to Fig. 10 showing another form of mounting;

Fig. 14 is a section on the line 14—14 of Fig. 13;

Fig. 15 is a perspective view showing another form of mounting;

Fig. 16 is a view looking down on Fig. 15;

Fig. 17 is a sectional view substantially on the line 17—17 of Fig. 15;

Fig. 18 is a perspective view showing another form of mounting;

Fig. 19 is a section substantially on the line 19—19 of Fig. 18;

Fig. 20 is a section substantially on the line 20—20 of Fig. 19;

Fig. 21 is a perspective view showing another form of mounting;

Fig. 22 is a section substantially on the line 22—22 of Fig. 21; and

Fig. 23 is a section substantially on the line 23—23 of Fig. 22.

Referring to the drawings in detail, and first to Figs. 1–8, incl., the construction shown comprises a lens rim 1 and a portion of the bridge 2 of flexible plastic material, the lens rim being in the general form of a split ring, having a groove 3 to receive the lens edge, the adjacent ends of the split ring being separable to enable the insertion of a lens therein, a pair of temple hinge members 4, one secured to each of said adjacent ends, means for securing the ends together to hold the ends in place, and a temple 5 hinged to said hinged members. Each hinge member comprises a plate portion 6 lying between the adjacent ends of the split ring and secured thereto. The means for securing the adjacent ends of the split ring together comprise screws 10 extending through the hinge members and plate portions. Each of the adjacent ends of the split ring is provided with a hinge supporting and abutment member 7 extending laterally from the rim portion which serves not only to support the hinge but also to limit the opening movement of the temple. The hinge member shown in detail in Figs. 6, 7, and 8 comprises the flat plate portion 6 secured to the lateral extension 7 of the plastic mounting by means of an eyelet 8 extending through the plate portion 6 and lateral extension 7 of the mounting, and a rivet 9 also extending through the lateral extension and plate portion, as shown in Fig. 5. The two adjacent ends of the split ring portion are secured together by means of a screw 10 swiveled in the upper eyelet member 8 and threaded into the lower eyelet member 8.

The temple 5 may be formed mainly of plastic material having a hinge member 11 embedded therein and secured thereto by rivets 12, the projecting hinge portions 13 of which are secured to the ears 13a of the hinge members 4 by means of a pivot pin 14 extending through the hinge members, as shown in Figs. 1, 2 and 5. Each hinge member 4 may be provided with an abutment lug 15 extending across a supporting face of the extension 7 on the rim mounting which may be engaged by the hinge member 11 on the temple to limit the opening movement of the temple.

In assembly, the split rim is forced open to the position shown in Fig. 3, the lens is slipped into place, the ends of the split rim are brought together, and the screw 10 is inserted and tightened to clamp the split rim tightly about the lens. The temple is then secured in place by bringing the hinge ears 13 into position to straddle the hinge portions 13a and inserting the screw 14 and tightening it up.

The construction shown in Fig. 9 is similar to that just described, except that here the abutment lugs 15 on the hinge members are omitted.

The construction shown in Figs. 10, 11, and 12 is similar to those just described, but in this form a metal box 16 provided with a hinge member 17 is slipped over a lateral extension 18 formed integral with the plastic split ring, and a screw 19 is inserted and tightened up to clamp the ends of the split ring securely and firmly about the lens. The box hinge members 16 may be secured on the laterally extending lugs 18 by bending the edges 20 of the box inwardly to engage shoulder portions on the lug after the box has been slipped in place over the lug, as shown in Fig. 11.

The construction shown in Figs. 13 and 14 is similar to that shown in Figs. 10, 11, and 12, except that here the box members 21 are secured in place on the ends of the split ring rim by means of fingers 22 bent inwardly to embrace the lateral extensions 18 on the split ring, shown specifically in Fig. 14. A screw 23 is provided for holding the ends of the split ring together.

The construction of Figs. 15, 16, and 17 is similar to that shown in Figs. 10–14, incl. In this form, however, each of the boxes 24 is provided with a pair of apertured ears 25 between which an apertured ear 26 of the temple hinge member extends, a pivot screw 27 being inserted through all six of these ears, as shown in Fig. 17.

In the construction of Figs. 18, 19, and 20, each of the adjacent ends of the split lens-holding rim is provided with a plate-like hinge member 28 secured to the plastic rim by eyelets 29, or the like. The ends of the rim are held together by means of screws 30, passing through the lower eyelets and threaded into the registering upper eyelets on the other end of the split rim. The hinge portion on the temple comprises a U-shaped strap 31 straddling the hinged end of the temple and having a pair of hinge ears 32 straddling the hinge ears 33 on the rim hinge members, and secured thereto by pivot screws 33a. The hinge strap may be secured to the ends of the temple in any suitable manner, as by rivets 34 passing through the arms of the strap. In this form, it will be noted that the hinge members 28 are mainly concealed and housed in the plastic portion of the mounting.

In the construction shown in Figs. 21, 22, and 23, the metal hinge members are still further concealed or housed and embedded in the plastic material. In this construction, the hinge members 35 are seated in recesses in the abutting ends of the split rim, the plastic material extending over the front edges of the hinge members so that the only projecting parts of the hinge members are the rearwardly extending ears 36. The hinge member on the temple comprises a plate 37 on the inner side of the temple having a pair of hinge ears 38 extending inwardly therefrom which straddle the hinge ears 36 on the rim hinge members, and are secured thereto by a pivot screw 39. The hinge member for the temple may be secured thereto by means of rivets 40.

It will be noted that in all of these forms, there is provided an ophthalmic mounting comprising a lens rim of flexible plastic material in the general form of a split ring and having a groove therein to receive the lens edge, with the adjacent ends of the split ring separable to enable the insertion of the lens, and with a pair of temple hinge members, one secured to each of the adjacent ends of the split ring, with means for securing the ends of the split ring together to hold the lens in place, and a temple hinged to the hinge members. It will also be noted that each hinge member comprises a plate portion lying between the adjacent ends of the split ring and secured thereto. It will also be noted that the adjacent ends of the split ring are all provided with a hinge supporting and abutment member extending laterally from the rim portion serving to support the hinge members and support the opening of the movement of the temple.

Further modifications will be apparent to those skilled in the art and it is desired, therefore, that the invention be limited only by the scope of the appended claims.

Having thus described my invention, what we claim and desire to secure by Letters Patent is:

1. An ophthalmic mounting comprising a lens rim of flexible plastic material in the general form of a split ring having a groove therein to engage and receive the lens edge, said split ring being formed entirely of plastic material throughout at least the major portion of its length, the ends of the split ring having parallel flat faces, adjacent ends of the split ring being separable to enable the insertion of the lens, a pair of temple hinge members, a first means for securing one of said hinge members to each of said adjacent ends, means for securing said ends together to hold the lens in place, and a temple hinged to said hinge members, each hinge member comprising a flat plate portion lying between said adjacent ends and secured thereto, said flat plate portions engaging each other and the flat faces of the ring ends in abutting relation to hold the plastic split ring properly aligned with respect to the temple, the engaging flat plate portions being substantially coextensive with the abutting flat faces of the ring ends.

2. An ophthalmic mounting comprising a lens rim of flexible plastic material in the general form of a split ring having a groove therein to engage and receive the lens edge, said split ring being formed entirely of plastic material throughout at least the major portion of its length, the ends of the split ring having parallel flat faces, adjacent ends of the split ring being separable to enable the insertion of the lens, a pair of temple hinge members, a first means for securing one of said hinge members to each of said adjacent ends, means for securing said ends together to hold the lens in place, and a temple hinged to said hinge members, each hinge member comprising a flat plate portion lying between said adjacent ends and secured thereto, said flat plate portions engaging each other and the flat faces of the ring ends in abutting relation to hold the plastic split ring properly aligned with respect to the temple, the engaging flat plate portions being substantially coextensive with the abutting flat faces of the ring ends, each of said first securing means comprising an eyelet extending through said plate portion and end, and said second securing means comprising a screw extending through one of said eyelets and threaded into the other eyelet.

WILLIAM R. UHLEMANN.
LOUIS J. BOOTH.